(12) United States Patent
Matsuoka

(10) Patent No.: US 10,897,165 B2
(45) Date of Patent: Jan. 19, 2021

(54) PERMANENT MAGNET SYNCHRONOUS MOTOR

(71) Applicant: Mitsubishi Electric Corporation, Tokyo (JP)

(72) Inventor: Atsushi Matsuoka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 728 days.

(21) Appl. No.: 15/556,404

(22) PCT Filed: Jun. 17, 2015

(86) PCT No.: PCT/JP2015/067464
§ 371 (c)(1),
(2) Date: Sep. 7, 2017

(87) PCT Pub. No.: WO2016/203574
PCT Pub. Date: Dec. 22, 2016

(65) Prior Publication Data
US 2018/0109153 A1    Apr. 19, 2018

(51) Int. Cl.
*H02K 1/14* (2006.01)
*H02K 21/16* (2006.01)
*H02K 1/27* (2006.01)

(52) U.S. Cl.
CPC ............. *H02K 1/148* (2013.01); *H02K 1/146* (2013.01); *H02K 1/276* (2013.01); *H02K 1/2766* (2013.01); *H02K 21/16* (2013.01)

(58) Field of Classification Search
CPC ........ H02K 1/146; H02K 1/148; H02K 1/276; H02K 1/2766; H02K 21/16; H02K 2213/03
(Continued)

(56) References Cited

U.S. PATENT DOCUMENTS

| 6,104,117 A * | 8/2000 | Nakamura | ............. | H02K 1/148 |
| | | | | 310/156.45 |
| 2002/0047460 A1* | 4/2002 | Yoneda | .................. | H02K 21/16 |
| | | | | 310/216.112 |

(Continued)

FOREIGN PATENT DOCUMENTS

| CN | 1574546 A | 2/2005 |
| CN | 1703819 A | 11/2005 |

(Continued)

OTHER PUBLICATIONS

Machine translation of JP-2000253602-A. (Year: 2000).*
(Continued)

*Primary Examiner* — Michael Andrews
(74) *Attorney, Agent, or Firm* — Posz Law Group, PLC

(57) ABSTRACT

An 8-pole 9-slot permanent magnet synchronous motor includes a stator core including an annular yoke and a plurality of teeth. Each of the plurality of teeth has a winding portion around which a coil is wound. The plurality of teeth include three teeth groups. Each of the three teeth groups includes a first tooth, a second tooth, and a third tooth of the teeth group sequentially arranged in a rotational direction of a rotor and around which coils of one phase are wound. The first tooth, second tooth, and third tooth of each of the three teeth groups are sequentially arranged in the rotational direction of the rotor. A width of the winding portion of the first tooth is narrower than a width of the winding portion of each of the second tooth and the third tooth.

7 Claims, 6 Drawing Sheets

(58) Field of Classification Search
USPC .......................................... 310/156.53, 254.1
See application file for complete search history.

(56) References Cited

U.S. PATENT DOCUMENTS

| | | | |
|---|---|---|---|
| 2004/0245881 A1* | 12/2004 | Kadoya | H02K 1/146 |
| | | | 310/185 |
| 2004/0251763 A1* | 12/2004 | Tamaki | H02K 1/2766 |
| | | | 310/156.53 |
| 2005/0231060 A1 | 10/2005 | Vollmer | |
| 2016/0172949 A1 | 6/2016 | Matsuoka et al. | |

FOREIGN PATENT DOCUMENTS

| | | |
|---|---|---|
| CN | 204179905 U | 2/2015 |
| JP | 62-110468 A | 5/1987 |
| JP | 63-129840 A | 6/1988 |
| JP | 63-144749 A | 6/1988 |
| JP | 02-084042 A | 3/1990 |
| JP | 2000-152581 A | 5/2000 |
| JP | 2000-253602 A | 9/2000 |
| JP | 2000253602 A * | 9/2000 |
| JP | 2005-102475 A | 4/2005 |
| JP | 2006-320051 A | 11/2006 |

OTHER PUBLICATIONS

Office Action dated Jan. 9, 2018 issued in corresponding JP patent application No. 2017-524204 (and English translation).

Office action dated Mar. 12, 2019 issued in corresponding CN patent application No. 201580078963.6 (and English translation thereof).

International Search Report of the International Searching Authority dated Aug. 25, 2015 for the corresponding international application No. PCT/JP2015/067464 (and English translation).

Office Action dated Jul. 9, 2019 issued in corresponding CN patent application No. 201580078963.6 (and English machine translation).

* cited by examiner

PERMANENT MAGNET SYNCHRONOUS MOTOR

CROSS REFERENCE TO RELATED APPLICATION

This application is a U.S. national stage application of International Patent Application No. PCT/JP2015/067464 filed on Jun. 17, 2015, the disclosure of which is incorporated herein by reference.

TECHNICAL FIELD

The present invention relates to a permanent magnet synchronous motor that rotates a rotor using magnetic fields generated by permanent magnets provided on the rotor and magnetic fields generated by currents flowing through coils wound on a stator.

BACKGROUND

In an 8-pole 9-slot permanent magnet synchronous motor having coils wound in concentrated winding, three adjacent teeth around which coils of the same phase are wound adjacent to each other, form one teeth group, and three teeth groups are arranged on a yoke. In the conventional synchronous motor described in Patent Literature 1, from among three adjacent teeth around which coils of the same phase are wound, the width of a rotor facing portion of the middle tooth is set wider than respective rotor facing portions of the two teeth on opposite sides to achieve higher efficiency and higher output.

PATENT LITERATURE

Patent Literature 1: Japanese Patent Application Laid-open Publication No. 2000-253602

In the 8-pole 9-slot permanent magnet synchronous motor, with respect to the rotational direction of a rotor, from among the three adjacent teeth around which coils of the same phase are wound, an iron loss occurring in the tooth located in front of the middle tooth along the rotor rotational direction is smaller than an iron loss occurring in the tooth located behind the middle tooth along the rotor rotational direction. That is, the iron losses occurring in the three adjacent teeth around which coils of the same phase are wound are not even. As such, in the 8-pole 9-slot permanent magnet synchronous motor, the respective iron losses occurring in the three adjacent teeth around which coils of the same phase are wound are different. However, the conventional technique described in Patent Literature 1 does not further improve motor efficiency focusing on the iron losses and shapes of the teeth.

SUMMARY

The present invention has been made in view of the above, and an object thereof is to provide a permanent magnet synchronous motor that further improves the motor efficiency.

To solve the above problem and achieve the object, a permanent magnet synchronous motor according to the present invention includes a stator core including an annular yoke and a plurality of teeth arranged inward of the yoke apart in a circumferential direction of the yoke; and a rotor placed inward of the stator core. Each of the plurality of teeth has a portion around which a coil is wound. The plurality of teeth include three teeth groups. Each of the three teeth groups includes a first tooth, a second tooth, and a third tooth of the teeth group sequentially arranged in a rotational direction of the rotor and around which coils of one phase are wound. A width of the portion of the first tooth is narrower than a width of the portion of each of the second tooth and the third tooth.

ADVANTAGEOUS EFFECTS OF INVENTION

The permanent magnet synchronous motor according to the present invention further improves the motor efficiency.

DETAILED DESCRIPTION

Permanent magnet synchronous motors according to embodiments of the present invention will be described in detail below with reference to the drawings. Note that these embodiments are not intended to limit the present invention.

First Embodiment

Figure 1:
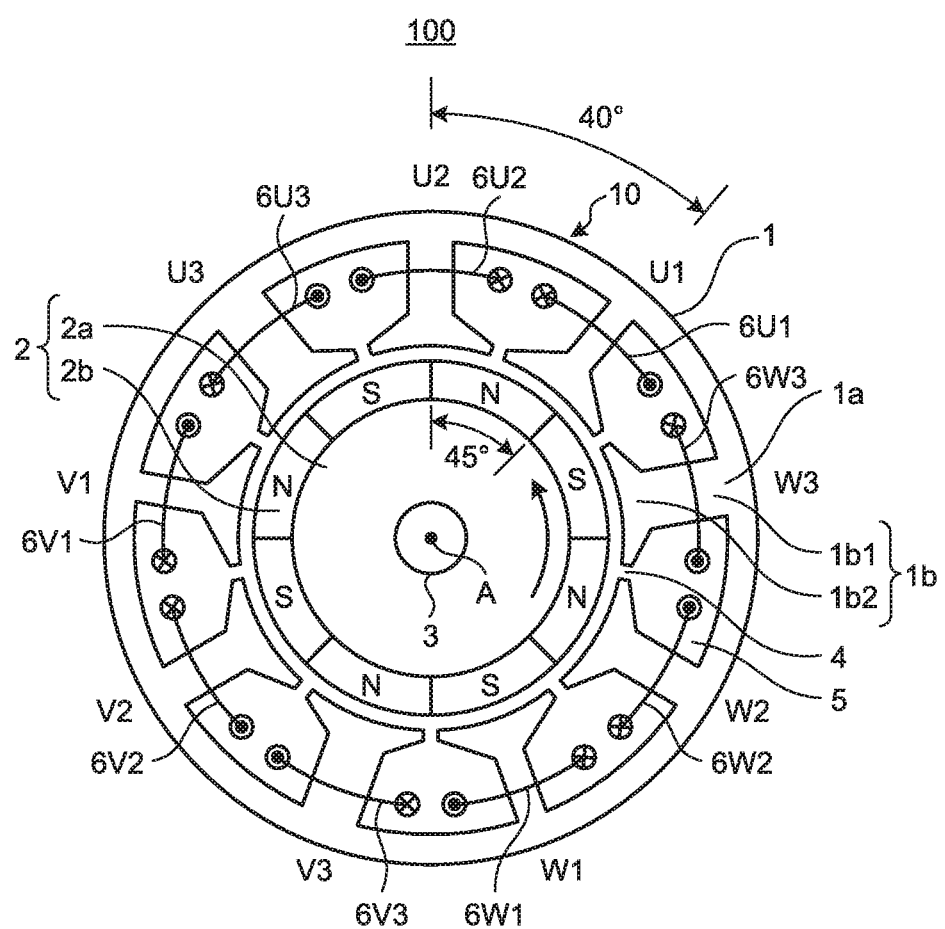
FIG. 1 is a transverse cross-sectional view of a permanent magnet synchronous motor according to a first embodiment of the present invention.

FIG. 1 is a transverse cross-sectional views of a permanent magnet synchronous motor according to a first embodiment of the present invention. The permanent magnet synchronous motor 100 includes a stator core 10 including an annular yoke 1a and nine teeth 1b arranged inward of the yoke 1a apart in a circumferential direction of the yoke 1a, and a rotor 2 placed inward of the stator core 10. The rotor 2 includes an annular rotor core 2a formed of magnetic steel sheets laid one over another to be fixed on a shaft 3 and eight permanent magnets 2b arranged on the outer edge of the rotor core 2a. The eight permanent magnets 2b are arranged alternately in a rotational direction such that adjacent permanent magnets 2b differ in polarity so as to form four pole pairs of N and S poles. The "rotational direction" refers to the direction in which the rotor 2 rotates. Each of the permanent magnets 2b is a rare-earth magnet or ferrite magnet.

A coil 6 (6U1, 6U2, 6U3, 6V1, 6V1, 6V2, 6V3, 6W1, 6W2, 6W3) is wound around each of the nine teeth 1b. The yoke 1a and the nine teeth 1b forming the stator core 10 are formed by stacking a plurality of core pieces punched out of magnetic steel sheet base material. Because the nine teeth 1b are arranged at equal intervals in the rotational direction, two adjacent teeth 1b form a mechanical angle of 40° with respect to the center axis A of the stator 1 as the center. As such, a plurality of sets of three adjacent teeth 1b, around which coils of the same phase are wound, are arranged on the yoke 1a.

Each of the nine teeth 1b includes a winding portion 1b1 extending from the inner circumferential surface of the yoke 1a toward the center of the stator 1 and around which a coil 6 is to be wound in concentrated winding and a brim-shaped or umbrella-shaped end 1b2 formed at the end of the tooth 1b to protrude in both rotational directions from the winding portion 1b1. The width of the winding portion 1b1 along a direction orthogonal to a radial direction of the stator is uniform. The end 1b2 has a shape symmetrical when going along the rotational direction. With the end 1b2 being in a brim or umbrella shape, the synchronous motor is structured such that the magnetic forces of the permanent magnets 2b of the rotor 2 are effectively interlinked with the teeth 1b, so that torque can be improved. In the first embodiment, the rotational direction width of the end 1b2 is the same for each of three adjacent teeth 1b around which coils of the same phase are wound. Hereinafter, the rotational direction width of the end 1b2 is referred to as an end width. Further, hereinafter, from among a set of three adjacent teeth 1b around which coils of the same phase are wound, the tooth 1b placed in the front of the set of three teeth along the rotational direction of the rotor 2 is referred to as a first tooth; the tooth 1b placed behind the first tooth along the rotational direction of the rotor 2 is referred to as a second tooth; and the tooth 1b placed behind the second tooth along the rotational direction of the rotor 2 is referred to as a third tooth.

In the stator core 10, a part surrounded by two adjacent teeth 1b forms a slot 5, so that nine slots 5 are provided. The permanent magnet synchronous motor 100 has eight poles and nine slots for the relationship between the number of magnetic poles and the number of slots, and coils forming three phases are wound in concentrated winding around the nine teeth 1b. Of these roils, coils of the same phase from among a U phase, a V phase, and a W phase are wound around the winding portions 1b1 of three adjacent teeth 1b respectively.

Specifically, three coils 6U1, 6U2, and 6U3 forming the U phase are wound around the winding portions 1b1 of three adjacent teeth 1b respectively. The winding direction of the coil 6U2 is opposite to that of the coil 6U1, and the winding direction of the coil 6U3 is opposite to that of the coil 6U2.

Three coils 6V1, 6V2, and 6V3 forming the V phase are wound around the winding portions 1b1 of three adjacent teeth 1b respectively. The winding direction of the coil 6V2 is opposite to that of the coil 6V1, and the winding direction of the coil 6V3 is opposite to that of the coil 6V2.

Three coils 6W1, 6W2, and 6W3 forming the W phase are wound around the winding portions 1b1 of three adjacent teeth 1b respectively. The winding direction of the coil 6W2 is opposite to that of the coil 6W1, and the winding direction of the coil 6W3 is opposite to that of the coil 6W2.

Figure 2:
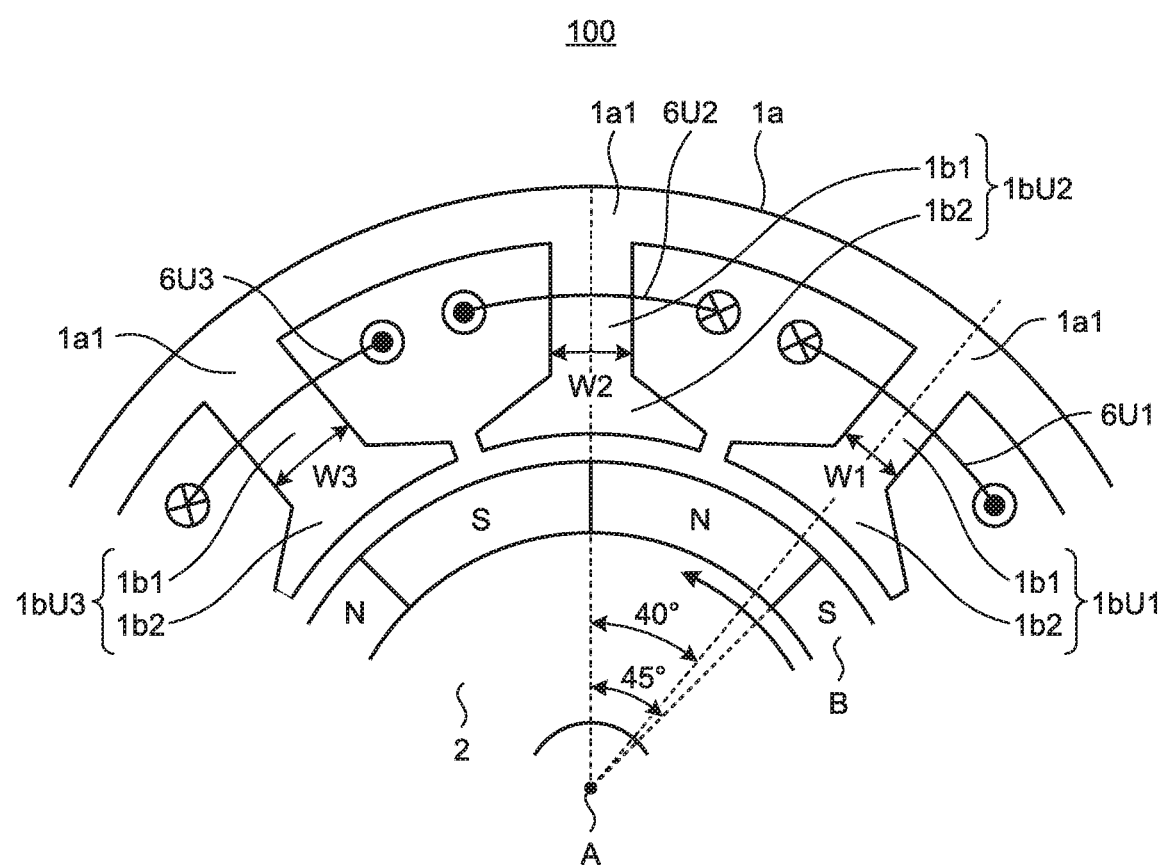
FIG. 2 is a fragmentary enlarged view of major parts of the permanent magnet synchronous motor according to the first embodiment of the present invention.

FIG. 2 is a fragmentary enlarged view of major parts of the permanent magnet synchronous motor according to the first embodiment of the present invention. FIG. 2 illustrates the set of three coils 6U1, 6U2 and 6U3 that form the U phase. In FIG. 2, it is assumed that the rotor 2 rotates counterclockwise. Further, in FIG. 2, from among a set of three adjacent teeth around which the coils 6U1, 6U2, and 6U3 are wound, the tooth placed in front along the rotational direction of the rotor 2 is referred to as a first tooth; the tooth placed behind the first tooth 1bU1 is referred to as a second tooth; and the tooth placed behind the second tooth 1bU2 is referred to as a third tooth.

In the permanent magnet synchronous motor 100, when the rotor 2 rotates, a phase difference occurs between the inductive voltage generated in the coil 6U1 wound around the first tooth 1bU1 and the inductive voltage generated in the coil 6U2 wound around the second tooth 1bU2. In the stator core 10 according to the first embodiment, focusing on this phase difference, the teeth are formed in such a way that the width W1 of the winding portion 1b1 of the first tooth 1bU1 is narrower than the width W2 of the winding portion 1b1 of the second tooth 1bU2. Further, the width W2 of the winding portion 1b1 of the second tooth 1bU2 is set narrower than the width W3 of the winding portion 1b1 of the third tooth 1bU3. The respective widths of the winding portions 1b1 of three adjacent teeth 1b around which the coils 6V1, 6V2, and 6V3 illustrated in FIG. 1 are wound also have the same relationship, and the respective widths of the winding portions 1b1 of three adjacent teeth 1b around which the coils 6W1, 6W2, and 6W3 are wound also have the same relationship. The width of each winding portion 1b1 is the rotational direction width of the winding portion 1b1.

The reason why the respective widths of the winding portions 1b1 of three adjacent teeth around which coils of the same phase are wound are different will be described below.

First, the phase difference between the combined inductive voltage for the same phase and the inductive voltage generated in each coil of one set of coils forming that same phase will be described. Where the teeth are arranged at equal intervals in the rotational direction, two adjacent teeth form a mechanical angle of 40° with respect to the center axis A of the stator 1 as the center. The mechanical angle of 40° is equal to 360° divided by nine, the number of slots. If coils are respectively wound around three adjacent teeth in the same direction, a phase difference of a 160° electrical angle occurs between inductive voltages generated in the individual coils when the rotor 2, of which the number of magnetic poles is eight, rotates. The electrical angle of 160° is equal to the mechanical angle of 40° multiplied by four, the number of pole pairs.

When the rotor 2 rotates, from among the plurality of magnetic poles, the phase of the inductive voltage generated in the coil 6U2 due to a permanent magnet 2b indicated by a reference symbol B passing by the second tooth 1bU2 is delayed by an electrical angle of 160° relative to the phase of the inductive voltage generated in the coil 6U1 due to the permanent magnet 2b indicated by the reference symbol B passing by the first tooth 1bU1.

In contrast, if the winding direction of one of the coils 6U1 and 6U2 is opposite to that of the other, the inductive voltage value is inverted in the positive/negative sign. Thus, the phase of the inductive voltage generated in the coil 6U1 due to the permanent magnet 2b indicated by the reference symbol B passing by the first tooth 1bU1 is delayed by an electrical angle of 20° relative to the phase of the inductive voltage generated in the coil 6U2 due to the permanent magnet 2b indicated by the reference symbol B passing by the second tooth 1bU2. That is, the phase difference between the inductive voltages is a −20° electrical angle. This −20° is equal to the value obtained by adding −180° to 160°.

Likewise, if the winding direction of one of the coils 6U2 and 6U3 is opposite to that of the other, the inductive voltage is inverted in the positive/negative sign. Thus, the phase of the inductive voltage generated in the coil 6U2 due to the permanent magnet 2b indicated by the reference symbol B passing by the second tooth 1bU2 is delayed by an electrical angle of 20° relative to the phase of the inductive voltage generated in the coil 6U3 due to the permanent magnet 2b indicated by the reference symbol B passing by the third tooth 1bU3.

As such, in the 8-pole 9-slot permanent magnet synchronous motor 100, because the phase differences between the respective inductive voltages generated in a set of coils 6 forming the same phase become a close value, these are dealt with as windings of the same phase.

Figure 3:
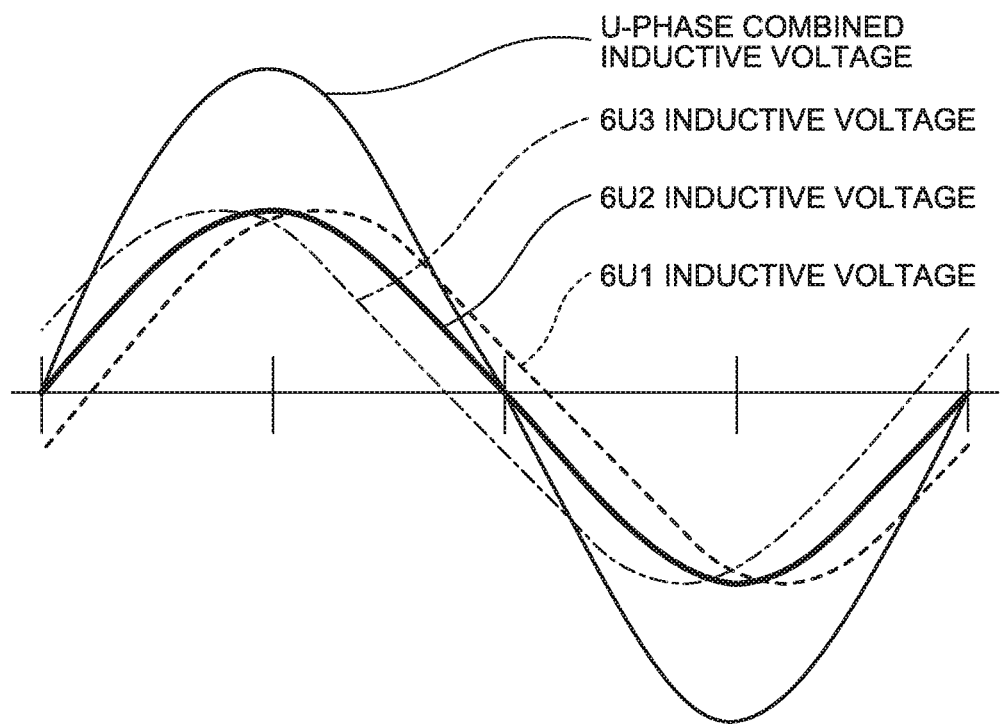
FIG. 3 is a graph illustrating the waveforms of respective inductive voltages generated in a set of coils forming a U phase and the waveform of a combined inductive voltage of these inductive voltages.

FIG. 3 is a graph illustrating the waveforms of the respective inductive voltages generated in a set of coils forming the U phase and the waveform of a combined inductive voltage of these inductive voltages.

The value of the U-phase combined inductive voltage illustrated in FIG. 3 is equal to the combined value of the inductive voltage generated in the coil 6U1, the inductive voltage generated in the coil 6U2, and the inductive voltage generated in the coil 6U3 illustrated in, e.g., FIG. 2. It is assumed that the phase of the U-phase combined inductive voltage coincides with the phase of the current flowing through the coils 6U1, 6U2, and 6U3. The phase of the inductive voltage generated in the coil 6U1 is delayed by an electrical angle of 20° relative to the U-phase combined inductive voltage; the phase of the inductive voltage generated in the coil 6U2 is the same as that of the U-phase combined inductive voltage; and the phase of the inductive voltage generated in the coil 6U3 is advanced by an electrical angle of 20° relative to the U-phase combined inductive voltage.

In order to generate torque in the permanent magnet synchronous motor, a sinusoidal current synchronous with the inductive voltage generated for each phase needs to flow through the coils of the corresponding phase. The generated torque varies with the phase of the inductive voltage for one phase and the phase of the current flowing through the coils, and in the case of the permanent magnet synchronous motor having a surface-arranged rotor whose permanent magnets are arranged on the surface of the rotor, the largest torque can be generated with the same current when the phase of the inductive voltage coincides with the phase of the current flowing through the coils. At this time, the relationship between the phase of the inductive voltage generated in the coil of each tooth and the phase of the current flowing through is as follows. A current whose phase is delayed relative to the inductive voltage generated in the coil of the first tooth flows; and a current whose phase is advanced relative to the inductive voltage generated in the coil of the third tooth flows.

The iron loss occurring in the stator iron core tends toward increasing as the magnetic flux density in the stator iron core becomes higher. When currents are conducted through the coils of the stator to generate output torque in the permanent magnet synchronous motor, because the magnetic flux generated from the coils is added to the magnetic flux generated from the permanent magnets, the magnetic flux density in the stator iron core increases, resulting in an increase in the iron loss. At this time, if the current is delayed in phase relative to the inductive voltage, the magnetic flux generated from the coils acts to increase the magnetic flux density in the iron core, and if the current is advanced in phase relative to the inductive voltage, the magnetic flux generated from the coils acts to decrease the magnetic flux density in the iron core. Hence, if the current is delayed in phase relative to the inductive voltage, the iron loss tends toward increasing, and if the current is advanced in phase relative to the inductive voltage, the iron loss tends toward decreasing.

As such, in the stator iron core of the 8-pole 9-slot permanent magnet synchronous motor, the phase advancement and delay of the current occur simultaneously. Hence, when the rotor 2 rotates as illustrated in FIG. 2, the iron loss occurring in the first tooth 1bU1 is smaller than the iron loss occurring in the second tooth 1bU2. The iron loss occurring in the third tooth 1bU3 is smaller than the iron loss occurring in the second tooth 1bU2. That is, the respective iron losses occurring in three adjacent teeth around which coils of the same phase are wound are not even.

The inventor of the present application, focused on the differences between the respective iron losses occurring in three adjacent teeth around which coils of the same phase are wound. The inventor thought of the permanent magnet synchronous motor 100 that can improve motor efficiency by setting the width of the winding portion 1b1 of the tooth placed in the front of a set of three adjacent teeth, around which coils of the same phase are wound, along the rotational direction of the rotor 2 to be narrower than the width of the winding portion 1b1 of the tooth placed in the middle of the set of three adjacent teeth, around which coils of the same phase are wound and setting the width of the winding portion 1b1 of the tooth in the front to be narrower than the width of the winding portion 1b1 of the tooth placed in the back of the set of three adjacent teeth, around which coils of the same phase are wound thereby shortening the circumferential length of the coil wound around the winding portion 1b1 of the tooth in the front to relatively reduce the copper loss of the coil.

Figure 4:
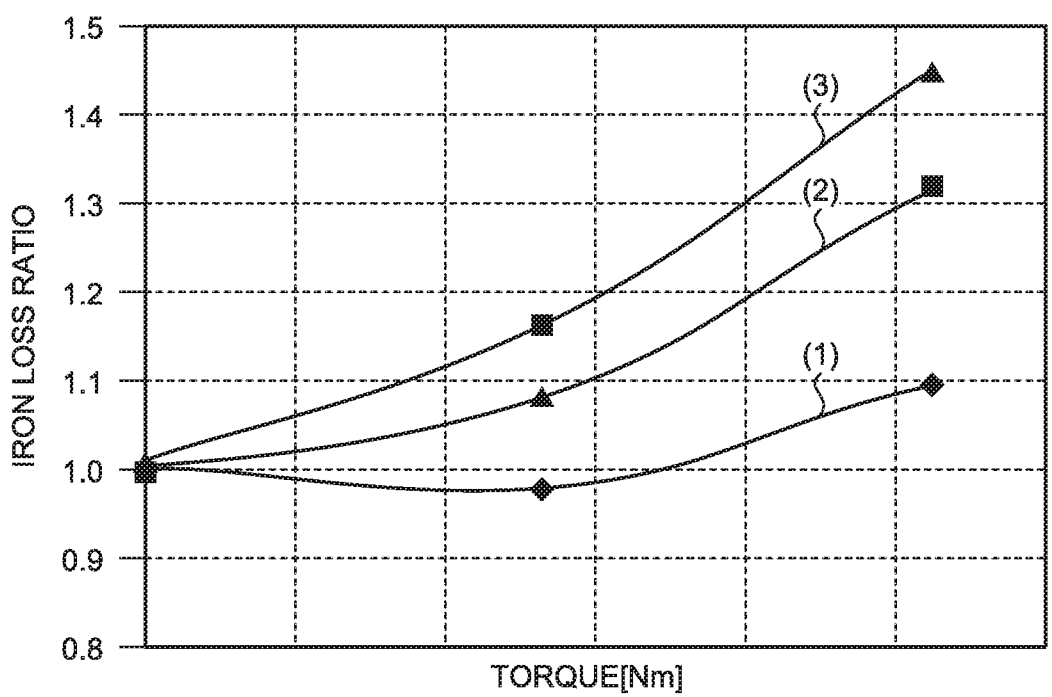
FIG. 4 is a graph illustrating the result of obtaining iron losses respectively occurring in three adjacent teeth around which coils of the same phase are wound in the permanent magnet synchronous motor according to the first embodiment of the present invention through electromagnetic field analysis to compare.

FIG. 4 is a graph illustrating the result of comparison of the iron losses respectively occurring in three adjacent teeth around which coils of the same phase are wound in the permanent magnet synchronous motor according to the first embodiment of the present invention, where the iron losses are obtained through electromagnetic field analysis. The horizontal axis represents the output torque of the permanent magnet synchronous motor 100 generated when a current whose phase coincides with the phase of the phase inductive voltage is conducted through the coils. The iron loss ratio represented by the vertical axis indicates the proportions of the iron losses respectively occurring in the winding portion 1b1 of the first tooth and the winding portion 1b1 of the third tooth to the iron loss occurring in the winding portion 1b1 of the second tooth from among the three adjacent teeth around which coils of the same phase are wound.

In FIG. 4, it is assumed that three adjacent teeth around which coils of the same phase are wound are in the same shape. That is, it is assumed that, for each of three adjacent teeth around which coils of the same phase are wound, the width of the winding portion 1b1 is the same and that the end width is the same.

The iron loss ratio indicated by (1) is the proportion of the iron loss occurring in the winding portion 1b1 of the first tooth to the iron loss occurring in the winding portion 1b1 of the second tooth. The iron loss ratio indicated by (2) is the proportion of the iron loss occurring in the winding portion 1b1 of the second tooth to the iron loss occurring in the second tooth, e.g., at the time of rotation without load. The iron loss ratio indicated by (3) is the proportion of the iron loss occurring in the winding portion 1b1 of the third tooth to the iron loss occurring in the winding portion 1b1 of the second tooth.

According to data illustrated in FIG. 4, at the time of rotation without load, that is, when no current is conducted through the coils, there is no difference in iron loss. However when a current is conducted through the coils, the iron loss ratios (2), (3) become greater than the iron loss ratio (1) as the output torque of the permanent magnet synchronous motor 100 increases.

The magnetic flux density in the iron core increases as the cross-section area of the flux path in the iron core decreases, and thus as the magnetic flux density in the iron core increases, the iron loss also increases. In general, the iron loss occurring in the iron core material is said to increase in proportion to the magnetic flux density to the power of 1.6 in the case of hysteresis loss. Hence, if each of the radial direction width of a yoke part 1a1, the width of the winding portion 1b1, and the radial direction width of the end 1b2 is decreased by the same size to make the flux path narrower, increase in iron loss can be suppressed to a minimum by selecting part that is the lowest in magnetic flux density to make its flux path narrower. Part of the iron core where the degree of increase in the magnetic flux density is the lowest is the winding portion 1b1 from among the yoke part 1a1, the winding portion 1b1, and the end 1b2.

In the permanent magnet synchronous motor of the present embodiment, focusing on the winding portion 1b1, where the degree of increase in the magnetic flux density is the lowest, as illustrated in FIG. 2, the width of the winding portion 1b1 of the first tooth 1bU1 is set narrower than the width of the winding portion 1b1 of the second tooth 1bU2 and narrower than the width of the winding portion 1b1 of the third tooth 1bU3. The reason why the winding portions 1b1 of the first tooth 1bU1 is made the narrowest is that the iron loss occurring in the first tooth 1bU1 located in front along the rotational direction of the rotor 2 from among three adjacent teeth 1b around which coils of the same phase are wound is smaller than the respective iron losses occurring in the second tooth 1bU2 and the third tooth 1bU3 as described previously. Thus, in the permanent magnet synchronous motor of the first embodiment, the circumferential length of the coil wound around the winding portion 1b1 of the first tooth 1bU1 can be made shorter than that of the coil wound around the winding portion 1b1 of the second tooth 1bU2 and shorter than that of the coil wound around the winding portion 1b1 of the third tooth 1bU3 with suppressing increase in the iron loss.

In the first embodiment, the widths of the winding portions 1b1 of three adjacent teeth around which coils of the same phase are wound are set sequentially larger in the rotational direction of the rotor 2. That is, as illustrated in FIG. 2, the width of the winding portion 1b1 of the second tooth 1bU2 is wider than the width of the winding portion 1b1 of the first tooth 1bU1, and the width of the winding portion 1b1 of the third tooth 1bU3 is wider than the width of the winding portion 1b1 of the second tooth 1bU2. As described above, the respective iron losses occurring in three adjacent teeth around which coils of the same phase are wound are sequentially larger in the rotational direction of the rotor 2. Thus, as in the first embodiment, by setting the respective widths of the winding portions 1b1 of the three adjacent teeth around which coils of the same phase are wound to be different correspondingly to the magnitudes of their iron losses sequential in the rotational direction of the rotor 2, the circumferential length of the coil can be shortened with suppressing the influence of increase in the iron loss to a low level, so that motor efficiency can be improved. Further, the amount of coil usage is suppressed, so that production cost can be further reduced.

Although in the first embodiment the respective widths of the winding portions 1b1 of three adjacent teeth around which coils of the same phase are wound are sequentially larger in the rotational direction of the rotor 2, not being limited to this, the width of the winding portion 1b1 of the second tooth from among the three adjacent teeth around which coils of the same phase are wound may be wider than the width of the winding portion 1b1 of the third tooth. Even with this configuration, as long as the respective widths of the ends 1b2 of the three teeth are the same, motor efficiency can be improved without impairing the characteristic of the 8-pole 9-slot permanent magnet synchronous motor that it can reduce cogging torque.

Second Embodiment

Figure 5:
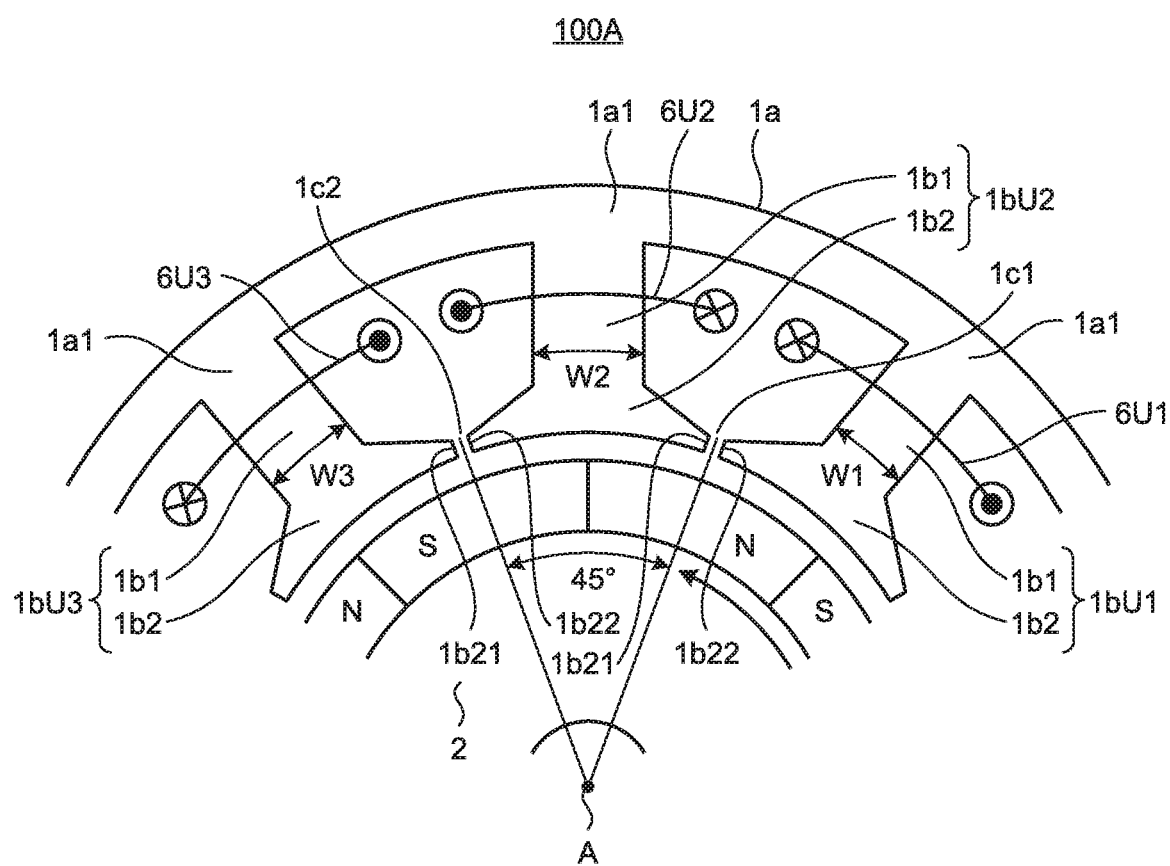
FIG. 5 is a fragmentary enlarged view of major parts of a permanent magnet synchronous motor according to a second embodiment of the present invention.

FIG. 5 is a fragmentary enlarged view of major parts of a permanent magnet synchronous motor according to a second embodiment of the present invention. In the second embodiment, the same reference numerals are used to denote the same parts as in the first embodiment with description thereof being omitted, and only different parts will be described. In the permanent magnet synchronous motor 100A according to the second embodiment, the end width of the second tooth is set wider than the end widths of the first and third teeth from among three adjacent teeth around which coils of the same phase are wound.

In the example of FIG. 5, the end width of the second tooth 1bU2 is 45°. The end width of the second tooth 1bU2 is defined as follows. That is, the end width of the second tooth 1bU2 is defined as a width measured from the middle of a slot opening 1c1 between the right circumferential direction end 1b21 of the second tooth 1bU2 and the left circumferential direction end 1b22 of the first tooth 1bU1 to the middle of a slot opening 1c2 between the left circumferential direction end 1b22 of the second tooth 1bU2 and the right circumferential direction end 1b21 of the third tooth 1bU3.

Further, in the permanent magnet synchronous motor 100A, the width of the winding portion 1b1 of the second tooth is set wider than the width of the winding portion 1b1 of the first tooth, and the width of the winding portion 1b1 of the second tooth is set wider than the width of the winding portion 1b1 of the third tooth. In the example of FIG. 5, the respective widths of the winding portions 1b1 of three adjacent teeth around which coils of the same phase are wound are set wider in the order of W1, W3, and W2.

Figure 6:
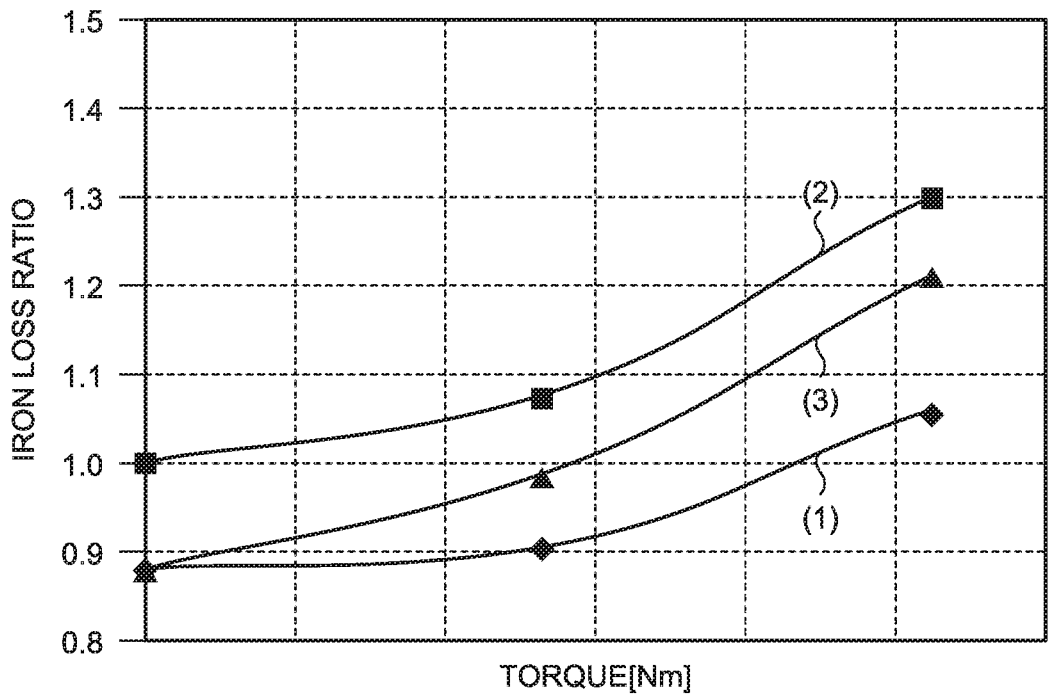
FIG. 6 is a graph illustrating the result of obtaining iron losses respectively occurring in three adjacent teeth around which coils of the same phase are wound in the permanent magnet synchronous motor according to the second embodiment of the present invention through electromagnetic field analysis to compare.

FIG. 6 is a graph illustrating the result of comparison of the iron losses respectively occurring in three adjacent teeth around which coils of the same phase are wound in the permanent magnet synchronous motor according to the second embodiment of the present invention, where the iron losses are obtained through electromagnetic field analysis.

The horizontal axis represents the output torque of the permanent magnet synchronous motor 100A generated when a current whose phase coincides with the phase of the phase inductive voltage is conducted through the coils. The iron loss ratio represented by the vertical axis indicates the proportions of the iron losses respectively occurring in the winding portion 1b1 of the first tooth and the winding portion 1b1 of the third tooth to the iron loss occurring in the winding portion 1b1 of the second tooth from among the three adjacent teeth around which coils of the same phase are wound.

In FIG. 6, it is assumed that the respective widths of the winding portions 1b1 of the three adjacent teeth around which coils of the same phase are wound are the same and that the end width of the second tooth is 45°. The iron loss ratios (1) to (3) correspond to the iron loss ratios (1) to (3) in FIG. 4.

In the first embodiment, the end widths of three adjacent teeth around which coils of the same phase are wound are the same. In contrast, in the second embodiment, the end width of the second tooth is set wider than the end widths of the first and third teeth. That is, the width of the end 1b2 of the second tooth is set wider than the width of the end 1b2 of the first tooth, and the width of the end 1b2 of the second tooth is set wider than the width of the end 1b2 of the third tooth. Hence, in the second embodiment, the iron loss occurring in the winding portion 1b1 of the second tooth is the largest as compared with the case where the end widths of three adjacent teeth around which coils of the same phase are wound are the same. In this configuration of FIG. 6, the iron loss decreases in the order of the second tooth, the third tooth, and the first tooth.

Accordingly, in the second embodiment, the synchronous motor is configured such that by increasing the width of the winding portion 1b1 of the second tooth as the end width of the second tooth increases, an increase in the iron loss occurring in the winding portion 1b1 of the second tooth is suppressed.

Figure 7:
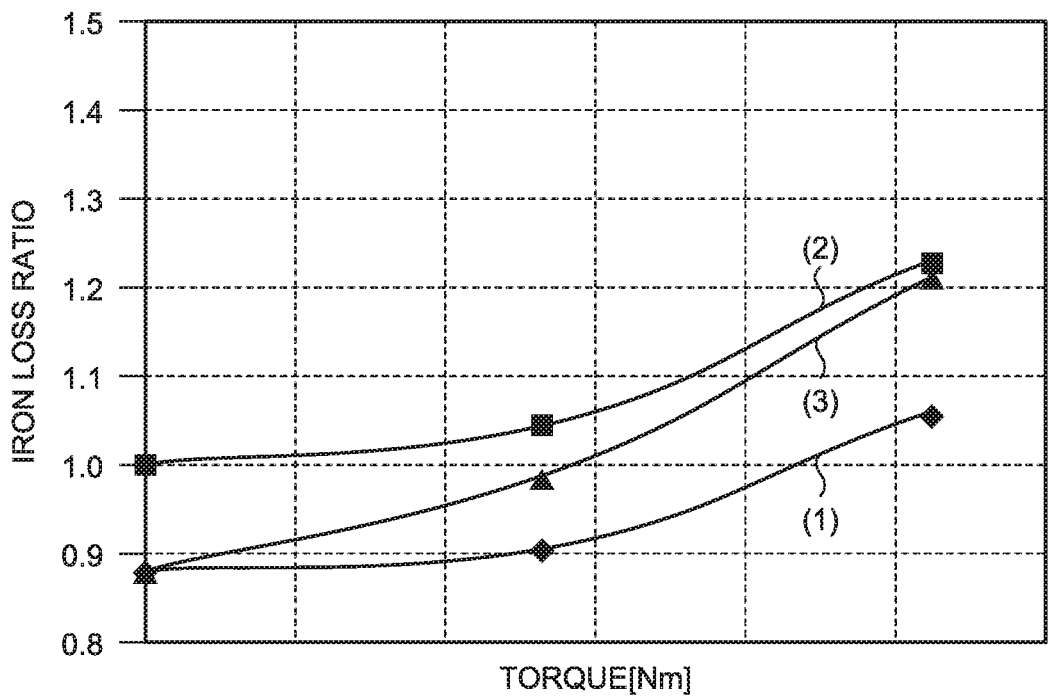
FIG. 7 is a graph illustrating the result of iron losses respectively occurring in three adjacent teeth around which coils of the same phase are wound and of which the width of the end of the second tooth is 42° in the permanent magnet synchronous motor according to the second embodiment of the present invention. The iron losses are obtained through electromagnetic field analysis and comparison.

FIG. 7 is a graph illustrating the result of comparison of the iron losses respectively occurring in three adjacent teeth around which coils of the same phase are wound and of which the width of the end of the second tooth is 42° in the permanent magnet synchronous motor according to the second embodiment of the present invention, where the iron losses are obtained through electromagnetic field analysis. The horizontal axis represents the output torque of the permanent magnet synchronous motor 100A generated when a current whose phase coincides with the phase of the phase inductive voltage is conducted through the coils, and the vertical axis represents the iron loss ratio.

According to FIG. 7, where the end width of the second tooth is 42°, it is seen that, as the output torque of the permanent magnet synchronous motor 100A increases, the iron loss occurring in the winding portion 1b1 of the second tooth becomes almost the same as the iron loss occurring in the third tooth. As such, where the end width of the second tooth is 42°, as compared with the case where the end width thereof is 45°, the iron loss occurring in the winding portion 1b1 of the second tooth is reduced. Hence, where the end width of the second tooth is 42°, the width of the winding portion 1b1 of the second tooth may be set equal to the width of the winding portion 1b1 of the third tooth.

Where the end width of the second tooth is 45°, the iron loss occurring in the winding portion 1b1 of the second tooth tends toward increasing as compared with the case where the end width thereof is 42°, but the end width of the second tooth is equal to 45° that is the rotational direction width of each of a plurality of magnetic poles formed in the rotor. Thus, where the end width of the second tooth is 45°, the amount of magnetic flux interlinked with the coil wound around the second tooth is the largest. As described above, the phase of the inductive voltage developed over the second tooth, from among the three adjacent teeth around which coils of the same phase are wound, coincides with the phase of the phase inductive voltage. Hence, when a current whose phase coincides with the phase of the phase inductive voltage is conducted through the coils, the second tooth outputs the largest torque from among the three adjacent teeth around which coils of the same phase are wound. Because increasing the amount of magnetic flux interlinked with the second tooth leads to an improvement in the output of the synchronous motor, the synchronous motor whose the end width of the second tooth is wider than those of the first and third teeth is larger in output and better in efficiency.

Figure 8:
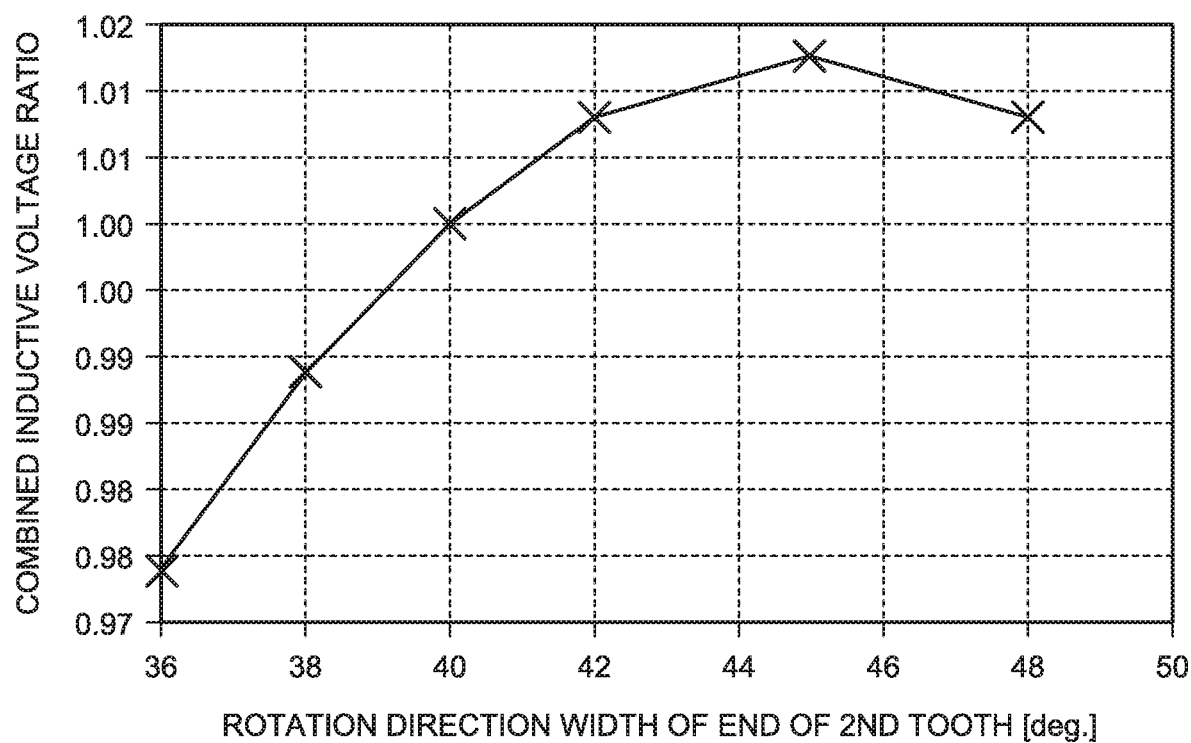
FIG. 8 is a graph illustrating inductive voltage ratios when the rotational direction width of the end of the second tooth from among three adjacent teeth around which coils of the same phase are wound is changed.

FIG. 8 is a graph illustrating inductive voltage ratios when the rotational direction width of the end of the second tooth from among three adjacent teeth around which coils of the same phase are wound is changed. The horizontal axis represents the end width of the second tooth. The vertical axis represents the combined inductive voltage ratio with respect to the combined inductive voltage of the same phase when the end width of the second tooth is 40°. As illustrated in FIG. 8, it is seen that the combined inductive voltage of the same phase is largest when the end width of the second tooth is 45°.

Meanwhile, in the second embodiment, since the end width of the second tooth is 45°, the iron loss occurring in the winding portion 1b1 of the second tooth is the largest as compared with the case where the end widths of three adjacent teeth, around which coils of the same phase are wound, are the same. Thus, in the second embodiment, the balance between the iron losses occurring in the winding portions 1b1 of three adjacent teeth around which coils of the same phase are wound is different from that in the case where the end widths of the three adjacent teeth are the same.

In the second embodiment, in order to achieve a balance between the iron losses occurring in the winding portions 1b1 of three adjacent teeth around which coils of the same phase are wound, as the end width of the second tooth is made wider, the width of the winding portion 1b1 of the second tooth is also made wider. In the example of FIG. 5, the width of the winding portion 1b1 of the second tooth is wider than that of the winding portion 1b1 of the first tooth and wider than that of the winding portion 1b1 of the third tooth. Thus, motor efficiency can be improved with suppressing increase in the iron loss occurring in the winding portion 1b1 of the second tooth.

In the permanent magnet synchronous motor 100A of the second embodiment, as in the permanent magnet synchronous motor 100 of the first embodiment, the width of the winding portion 1b1 of the first tooth from among three adjacent teeth around which coils of the same phase are wound, is made relatively narrower. Thus copper loss is reduced correspondingly to the shortening of the circumferential length of the coil, so that motor efficiency can be improved, that production cost can be reduced, and that the permanent magnet synchronous motor 100A can be made lighter in weight.

Although in the first and second embodiments a surface permanent magnet (SPM) type of rotor 2 whose permanent magnets 2b are arranged on the outer edge of the rotor core 2a is used, an interior permanent magnet (IPM) type of rotor 2 whose permanent magnets 2b are embedded in the rotor core 2a may be used. In the case of an IPM-type rotor, permanent magnets are fixed in a rotor core by inserting, through pressing in, the permanent magnets into magnet inserting holes formed in the rotor core or by coating an adhesive. Further, not being limited to the one having magnetic steel sheets laid one over another, the rotor core 2a may be an integral core obtained by processing steel material, a resin core obtained by solidifying a mixture of resin and iron powder, or a dust core obtained by pressure forming magnetic powder, the type of core to be used varying according to the purpose and application.

As described above, the permanent magnet synchronous motor according to the first and second embodiments includes a stator core including an annular yoke and a plurality of teeth, and a rotor placed inward of the stator core. Each of the plurality of teeth has a winding portion around which a coil is wound. The plurality of teeth include three teeth groups. Each of the three teeth groups includes adjacent first, second, and third teeth of the teeth group around which coils of the same phase are wound. The first, second, and third teeth of each of the three teeth groups are sequentially arranged in a rotational direction of the rotor. The width of the winding portion of the first tooth is narrower than the widths of the winding portions of the second and third teeth. With this configuration, the circumferential length of the coil wound around the winding portion 1b1 of the first tooth can be shortened with suppressing increase in the iron loss in the winding portion 1b1 of the first tooth, and thus copper loss is reduced correspondingly to the shortening of the circumferential length of the coil, so that motor efficiency can be improved. Further, the amount of coil usage is suppressed, so that production cost can be reduced. Yet further, the weight of the coil is reduced correspondingly to the shortening of the circumferential length of the coil, so that the permanent magnet synchronous motor can be made lighter in weight.

The configuration shown in the above embodiments is illustrative of the content of the present invention, and it is possible to combine it with other publicly known techniques, and also part of the configuration can be omitted or changed without departing from the spirit of the present invention.

The invention claimed is:

1. A stator core for a permanent magnet synchronous motor having an 8-pole rotor, the stator core including an annular yoke and a plurality of teeth arranged inward of the yoke, apart in a circumferential direction of the yoke, and forming nine slots,
wherein each of the plurality of teeth has a portion around which a coil is wound,
wherein the plurality of teeth include three teeth groups,
wherein each of the three teeth groups includes a first tooth, a second tooth, and a third tooth sequentially arranged in a rotational direction of the rotor and around which coils of one phase are wound, and
wherein a width of the portion of the first tooth is narrower than a width of the portion of each of the second tooth and the third tooth.

2. The stator core according to claim 1,
wherein the width of the portion of the second tooth is wider than the width of the portion of the first tooth, and the width of the portion of the third tooth is wider than the width of the portion of the second tooth.

3. The stator core according to claim 1,
wherein a width of the end of the second tooth is wider than a width of the end of the first tooth, and the width of the end of the second tooth is wider than a width of the end of the third tooth.

4. The stator core according to claim 3,
wherein a width measured from a slot opening between the second tooth and the first tooth to a slot opening between the second tooth and the third tooth is set at a mechanical angle of 45°.

5. The stator core according to claim 3,
wherein the width of the portion of the second tooth is wider than the width of the portion of the first tooth, and the width of the portion of the second tooth is wider than the width of the portion of the third tooth.

6. A permanent magnet synchronous motor comprising:
a stator core including an annular yoke and a plurality of teeth arranged inward of the yoke, apart in a circumferential direction of the yoke, and forming nine slots,
wherein each of the plurality of teeth has a portion around which a coil is wound,
wherein the plurality of teeth include three teeth groups,
wherein each of the three teeth groups includes a first tooth, a second tooth, and a third tooth sequentially arranged in a rotational direction of the rotor and around which coils of one phase are wound, and
wherein a width of the portion of the first tooth is narrower than a width of the portion of each of the second tooth and the third tooth.

7. An air-conditioning apparatus comprising a permanent magnet synchronous motor, the permanent magnet synchronous motor including:
a stator core including an annular yoke and a plurality of teeth arranged inward of the yoke, apart in a circumferential direction of the yoke, and forming nine slots,
wherein each of the plurality of teeth has a portion around which a coil is wound,
wherein the plurality of teeth include three teeth groups,
wherein each of the three teeth groups includes a first tooth, a second tooth, and a third tooth sequentially arranged in a rotational direction of the rotor and around which coils of one phase are wound, and
wherein a width of the portion of the first tooth is narrower than a width of the portion of each of the second tooth and the third tooth.

* * * * *